(12) United States Patent
Luo et al.

(10) Patent No.: US 10,951,049 B2
(45) Date of Patent: Mar. 16, 2021

(54) BATTERY CHARGING CIRCUIT WITH IMPROVED SYSTEM STABILITY AND CONTROL METHOD THEREOF

(71) Applicant: Chengdu Monolithic Power Systems Co., Ltd., Chengdu (CN)

(72) Inventors: Suhua Luo, Hangzhou (CN); Pengpeng Ma, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 239 days.

(21) Appl. No.: 16/228,241

(22) Filed: Dec. 20, 2018

(65) Prior Publication Data

US 2019/0207392 A1    Jul. 4, 2019

(30) Foreign Application Priority Data

Dec. 29, 2017 (CN) .......................... 201711469042.X

(51) Int. Cl.
*H02J 7/00* (2006.01)

(52) U.S. Cl.
CPC .................................. *H02J 7/007* (2013.01)

(58) Field of Classification Search
CPC ....................................................... H02J 7/007
See application file for complete search history.

(56) References Cited

U.S. PATENT DOCUMENTS

| 9,431,845 | B2 | 8/2016 | Xu et al. |
| 10,063,078 | B2 | 8/2018 | Xu et al. |
| 10,110,037 | B2 | 10/2018 | Ouyang |
| 10,116,155 | B2 | 10/2018 | Xu et al. |
| 2016/0226264 | A1 | 8/2016 | Xu et al. |

*Primary Examiner* — Jack Chiang
*Assistant Examiner* — Aric Lin
(74) *Attorney, Agent, or Firm* — Perkins Coie LLP

(57) ABSTRACT

A control method for controlling a battery charging circuit having at least one switch, includes: generating a first difference signal based on a charging current feedback signal and a charging current reference signal; generating a second difference signal based on a battery voltage feedback signal and a battery voltage reference signal; based on a battery voltage, selecting one of the first and second difference signals, and a ground voltage as a third difference signal; generating a bias signal by proportionally integrating the third difference signal; comparing the sum of a system voltage feedback signal and a ramp signal with the sum of the bias signal and a system voltage reference signal and generating a comparison signal; generating a control signal to control the at least one switch of based on the comparison signal and a constant time period control signal.

19 Claims, 10 Drawing Sheets

US 10,951,049 B2

BATTERY CHARGING CIRCUIT WITH IMPROVED SYSTEM STABILITY AND CONTROL METHOD THEREOF

CROSS-REFERENCE TO RELATED APPLICATIONS

This application claims the benefit of CN application 201711469042.X, filed on Dec. 29, 2017, and incorporated herein by reference.

TECHNICAL FIELD

The present invention relates generally to electrical circuits, and more particularly but not exclusively to battery charging circuits.

BACKGROUND

With development of the electronic technology, a computing system is widely used. From handheld electronic devices such as, for example, tablet personal computer, e-book, digital camera, to large electronic devices such as, for example, server, computing base station, all require the computing system. A computing platform comprises a central processing unit (CPU) and other components. The CPU is utilized to interpret machine readable instructions and process all data in the computing system. A voltage regulator is needed to power the CPU. In addition, a battery is utilized to provide power to the voltage regulator when the computing platform disconnects from an external power supply. Thus, a battery charging circuit is absolutely needed to provide a system voltage to the voltage regulator and charge the battery when the computing platform connects to the external power supply, for the purpose of controlling the charging process.

Because of the diversified power supply and batteries, multiple variables, e.g., a system voltage for a system load, a charging current to the battery and a battery voltage and so on should be involved in the control of the charging process. However, the unsmooth switching among the multiple control loops of multiple variables will lead to the problem of system instability. Thus, the battery charging circuit should be designed to satisfy demands of system stability.

SUMMARY

Embodiments of the present invention are directed to a battery charging circuit having at least one switch, a first difference circuit, a second difference circuit, a selection circuit, a bias circuit, a comparison circuit, a constant time period control circuit and a logic circuit. The first difference circuit is configured to receive a charging current feedback signal and a charging current reference signal and provide a first difference signal at an output terminal. The second difference circuit is configured to receive a battery voltage feedback signal and a battery voltage reference signal and provide a second difference signal at an output terminal. The selection circuit has a first input terminal configured to receive the first difference signal and a second input terminal configured to receive the second difference signal, wherein based on a battery voltage, the selection circuit selects one of the first difference signal, the second difference signal and a ground voltage as a third difference signal at an output terminal. The bias circuit is coupled to the output terminal of the selection circuit to receive the third difference signal, the bias circuit proportionally integrates the third difference signal and provides a bias signal at an output terminal. The comparison circuit has a first input terminal, a second input terminal and an output terminal, wherein the first input terminal is configured to receive the sum of the bias signal and a system voltage reference signal, the second input terminal is configured to receive the sum of a system voltage feedback signal and a ramp signal, and the comparison circuit provides a comparison signal at the output terminal. The constant time period control circuit configured to provide a constant time period control signal. The logic circuit configured to receive the comparison signal and the constant time period control signal, wherein the logic circuit provides a control signal at an output terminal to control the at least one switch.

BRIEF DESCRIPTION OF THE DRAWING

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
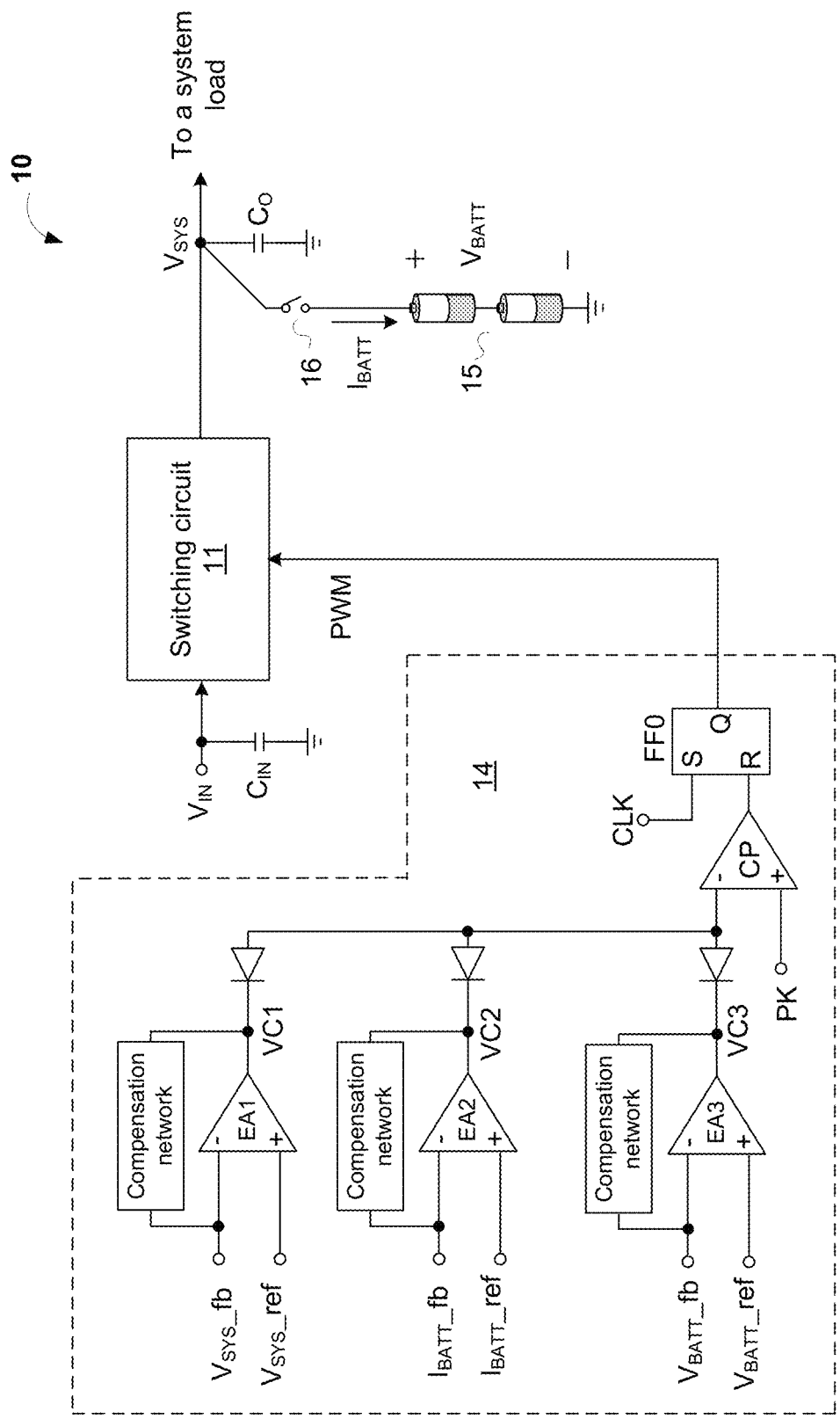
FIG. 1 shows a schematic diagram of a prior electronic device 10.

FIG. 1 shows a schematic diagram of a prior electronic device 10. The electronic device 10 comprises a battery charging circuit having a switching circuit 11, a switch 16 and a control circuit 14. The switching circuit 11 comprises at least one switch. The battery charging circuit and/or the battery 15 provide a system voltage $V_{SYS}$ to a system load. The switching circuit 11 has an input terminal configured to receive an input voltage $V_{IN}$ and an output terminal configured to provide the system voltage $V_{SYS}$. When the switching circuit 11 is disconnected from an external power supply, the input voltage VIN is equal to 0, the battery 15 provides the system voltage $V_{SYS}$ via the switch 16. When the switching circuit 11 is connected to the external power supply, for example, an external AC power supply or an external DC power supply is connected to the switching circuit 11 through an appropriate adapter, the external power supply provides the system voltage $V_{SYS}$ via the switching circuit 11, and provides a charging current $I_{BATT}$ to charge the battery 15 via the switch 16.

Figure 2:
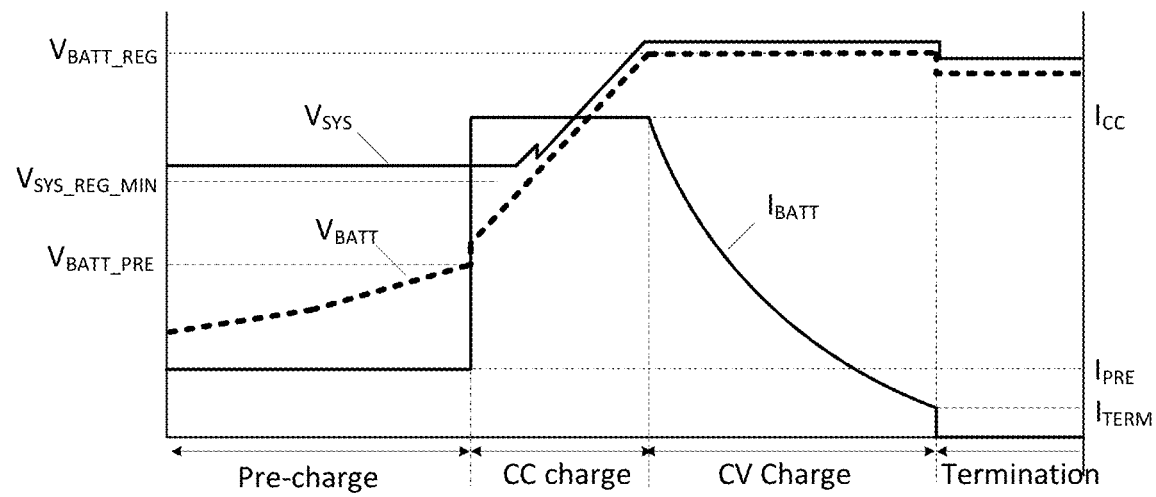
FIG. 2 shows current and voltage waveforms during charging process of a battery.

FIG. 2 shows current and voltage waveforms during charging process of a battery. As shown in FIG. 2, based on a battery voltage VBATT, the charging process can be split into four stages. A first stage is pre-charge stage, the battery is pre-charged at a small current $I_{PRE}$ and the system voltage $V_{SYS}$ is maintained at a system voltage minimum value $V_{SYS\_REG\_MIN}$ during the pre-charge stage. The first stage ends and a second stage starts when the battery voltage $V_{BATT}$ increases to a first threshold $V_{BAT\_PRE}$. The second stage is CC (constant current) charge. The battery 15 is charged quickly at a constant charging current $I_{BATT}$ that equals to a current reference $I_{CC}$ during the CC charge stage. The second stage ends and a third stage starts when the battery voltage $V_{BATT}$ increases to a second threshold $V_{BATT\_REG}$. The third stage is CV (constant voltage) charge stage. The charging current $I_{BATT}$ is decreased gradually and the battery voltage $V_{BATT}$ is kept at the second threshold $V_{BATT\_REG}$ during the CV charge stage. The fourth stage begins when the charging current $I_{BATT}$ is decreased to reach the current threshold $I_{TERM}$. The fourth stage is charging termination, the battery is nearly full, and the charging process is complete.

Referring still to FIG. 1, the control circuit 14 comprises three control loops for three variables including the system voltage $V_{SYS}$, the battery voltage $V_{BATT}$ and the charging current $I_{BATT}$. During the charging for the battery 15, the control circuit 14 is configured to provide a control signal PWM by switching the three control loops and to regulate the battery charging circuit output signals to the desired values, the battery charging circuit output signals includes the system voltage $V_{SYS}$, the charging current $I_{BATT}$ and/or the battery voltage $V_{BATT}$. Since each of the three control loops needs a corresponding error amplifier and needs a corresponding compensation network to stabilize the whole control circuit 14, as a result, the control circuit 14 is complicated and inefficiency. Meantime, the unsmooth switching among the three control loops may lead to system instability.

Figure 3:
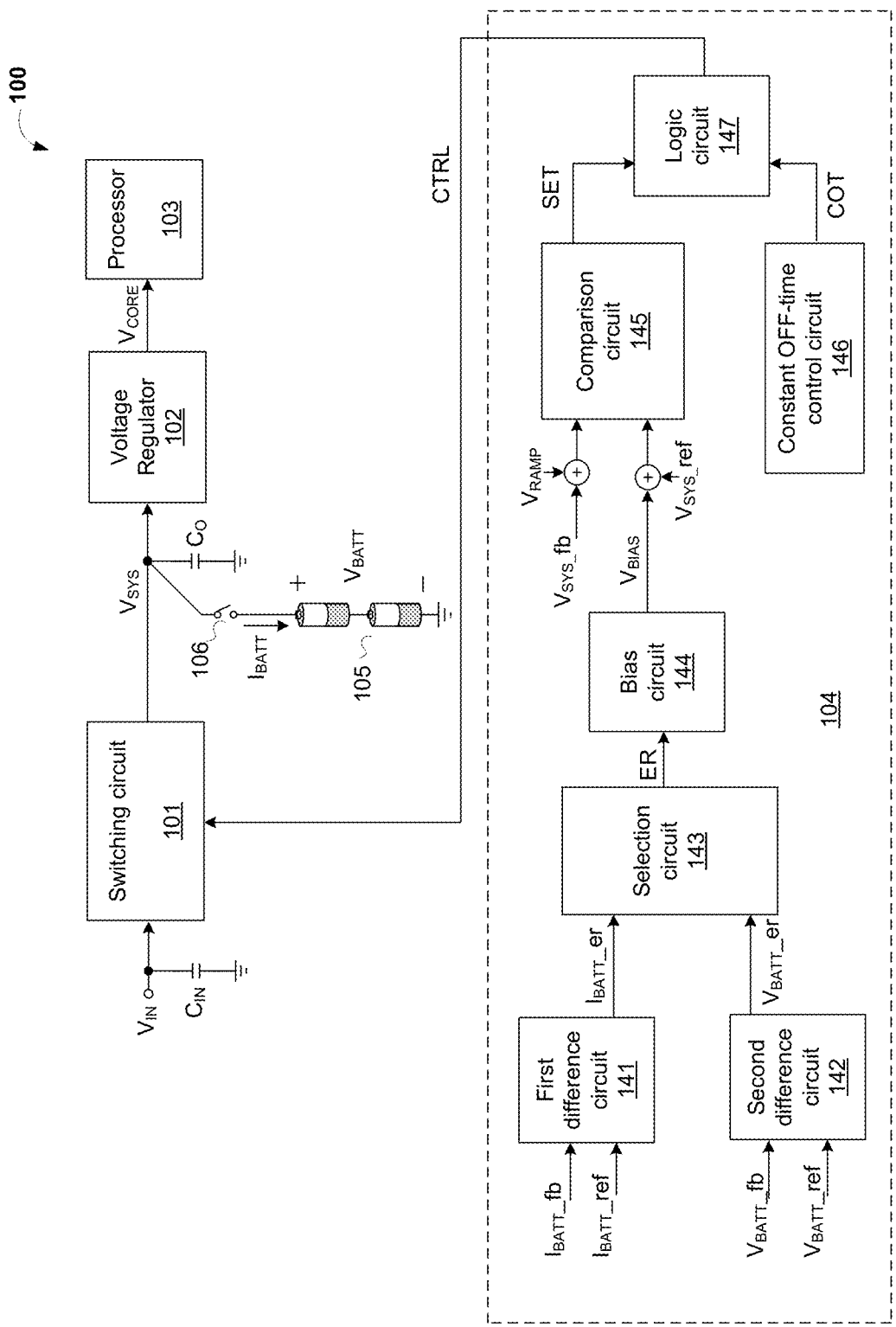
FIG. 3 shows a schematic diagram of an electronic device 100 in accordance with an embodiment of the present invention.

FIG. 3 shows a schematic diagram of an electronic device 100 in accordance with an embodiment of the present invention. The electronic device 100 comprises a battery charging circuit, a voltage regulator (VR) 102 and a processor 103. The battery charging circuit comprises a switching circuit 101 having at least one switch, a switch 106, and a control circuit 104. The processor 103 may be a CPU, a graphics processing unit (GPU) or an application specific integrated circuit (ASIC). In one embodiment, the electronic device 100 is part of a computing platform, and the battery charging circuit, the battery 105, and the voltage regulator 102 provides power to the computing platform. One or both of the battery charging circuit and the battery 105 provides a system voltage $V_{SYS}$ to the computing platform. The voltage regulator 102 converts the system voltage $V_{SYS}$ to a processor voltage $V_{CORE}$ to the processor 103. In one embodiment, the battery charging circuit comprises a narrow voltage direct current (NVDC) battery charging circuit. The switching circuit 101 has an input terminal configured to receive an input voltage $V_{IN}$ and an output terminal configured to provide the system voltage $V_{SYS}$. When switching circuit 101 connects to an external power supply, the system voltage $V_{SYS}$ is provided by the switching circuit 101, and the battery 105 is charged by switching circuit 101 through the switch 16 with a charging current $I_{BATT}$.

In the embodiment of FIG. 3, the control circuit 104 comprises a first deference circuit 141, a second difference circuit 142, a selection circuit 143, a bias circuit 144, a comparison circuit 145, a constant time period control circuit 146 and a logic circuit 147. The first difference circuit 141 is configured to receive a charging current feedback signal $I_{BATT\_}$fb and a charging current reference signal $I_{BATT\_}$ref, the first difference circuit 141 is configured to provide a first difference signal $I_{BATT\_}$er at an output terminal. In one embodiment, the charging current reference signal $I_{BATT\_}$ref is equal to the current reference $I_{CC}$. In another embodiment, the charging current reference signal $I_{BATT\_}$ref is related to the current reference $I_{CC}$. The second difference circuit 142 is configured to receive a battery voltage feedback signal $V_{BATT\_}$fb and a voltage reference signal $V_{BATT\_}$ref, and to provide a second difference signal $V_{BATT\_}$er at an output terminal. In one embodiment, the voltage reference signal $V_{BATT\_}$ref is equal to the second threshold $V_{BATT\_REG}$. in another embodiment, the battery voltage reference signal $V_{BATT\_}$ref is related to the second threshold $V_{BATT\_REG}$.

The selection circuit 143 has a first input terminal, a second input terminal and an output terminal, wherein the first input terminal is configured to receive the first difference signal $I_{BATT\_}$er, the second input terminal is configured to receive the second difference signal $V_{BATT\_}$er, based on the battery voltage $V_{BATT}$, the selection circuit 143 selects one of the first difference signal $I_{BATT\_}$er, the second difference signal $V_{BATT\_}$er and a ground voltage as a third difference signal ER and provides the third difference signal ER to the output terminal of the selection circuit 143. In one embodiment, when the battery voltage $V_{BATT}$ is less than the first threshold $V_{BATT\_PRE}$, the battery charging circuit works at the pre-charge stage, the selection circuit 143 selects the ground voltage as the third difference signal ER to the output terminal of the selection circuit 143. When the battery voltage $V_{BATT}$ is between the first threshold $V_{BATT\_PRE}$ and the second threshold $V_{BATT\_REG}$, the battery charging circuit works at the CC charge stage, and the selection circuit 143 selects the first difference signal $I_{BATT}\_er$ as the third difference signal ER to the output terminal of the selection circuit 143. When the battery voltage $V_{BATT}$ increases to reach the second threshold $V_{BATT\_REG}$, the battery charging circuit works at the CV charge stage, and the selection circuit 143 selects the second difference signal $V_{BATT}\_er$ as the third difference signal ER to the output terminal of the selection circuit 143.

The bias circuit 144 is coupled to the output terminal of the selection circuit 143 and proportionally integrates the third difference signal ER to provide a bias signal $V_{BIAS}$ at an output terminal. The comparison circuit 145 has a first input terminal, a second input terminal and an output terminal, wherein the first input terminal is configured to receive the sum of the bias signal $V_{BIAS}$ and a system voltage reference signal $V_{SYS}\_ref$, the second input terminal is configured to receive the sum of a system voltage feedback signal $V_{SYS}\_fb$ and a ramp signal $V_{RAMP}$, the comparison circuit 145 provides a comparison signal SET at the output terminal.

The constant time period control circuit 146 is configured to provide a constant time period control signal COT. In one embodiment, the constant time period control circuit 146 comprises a constant ON-time control circuit, in detail, during each of switching cycles, the constant time period control signal COT has a pulse, which is used to trig the OFF state of the at least one switch after a preset constant ON-time period. The constant ON-time control circuit is well known to persons of ordinary skill in the art, and will not be discussed here for brevity. The logic circuit 147 receives the comparison signal SET and the constant time period control signal COT, and provides a control signal CTRL to control the at least one switch of the switching circuit 101.

In accordance with this present invention, the control signal CTRL for controlling the at least one switch is adjusted based on the bias signal $V_{BIAS}$ so that the output signals of the battery charging circuit including the system voltage $V_{SYS}$, the charging current $I_{BATT}$ and the battery voltage $V_{BATT}$ can be regulated to the desired values. In detail, for example, during the pre-charge stage, the control signal CTRL is adjusted based on the bias signal $V_{BIAS}$ which is generated based on the ground voltage, so that the system voltage $V_{SYS}$ can be regulated to the system voltage minimum value $V_{SYS\_REG\_MIN}$. During the CC charge stage, the control signal CTRL is adjusted based on the bias signal $V_{BIAS}$ which is generated based on the first difference signal $I_{BATT}\_er$, so that the charging current $I_{BATT}$ can be regulated to maintain at the current reference $I_{CC}$. During the CV charging stage, the control signal CTRL is adjusted based on the bias signal $V_{BIAS}$ which is generated based on the second difference signal $V_{BATT}\_er$, so that the battery voltage $V_{BATT}$ can be maintained to be the second threshold $V_{BATT\_REG}$.

Figure 4A:
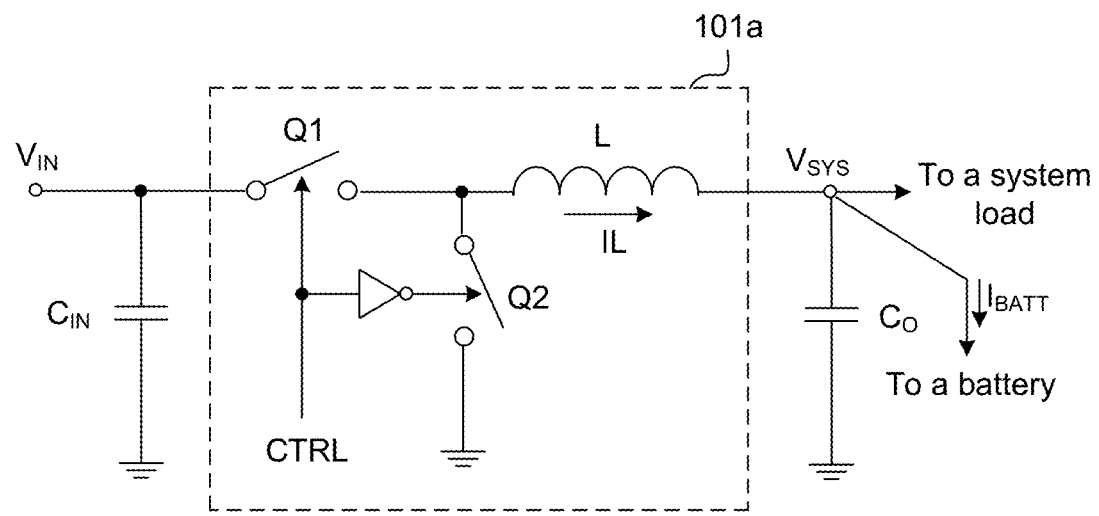
FIG. 4a schematically illustrates a switching circuit 101a in accordance with an embodiment of the present invention.

FIG. 4a schematically illustrates a switching circuit 101a in accordance with an embodiment of the present invention. The switching circuit 101a adopts a step-down (Buck) circuit as one example. The switching circuit 101a comprises a capacitor $C_{IN}$ coupled between the input terminal of switching circuit 101a and a reference ground, a capacitor $C_O$ coupled between the output terminal of switching circuit 101a and the reference ground, switches Q1 and Q2, and an inductor L. The switch Q1 has a first terminal coupled to the input terminal of switching circuit 101a, and a second terminal. The switch Q2 has a first terminal coupled to the second terminal of the switch Q1, and a second terminal coupled to the reference ground. The inductor L has a first terminal coupled to the second terminal of switch Q1 and a first terminal of the switch Q2, and a second terminal coupled to the output terminal of the switching circuit 101a. The switches Q1 and Q2 are controlled by control signal CTRL, and work complementarily. In one embodiment, the switch Q2 may be substituted by a diode.

Figure 4B:
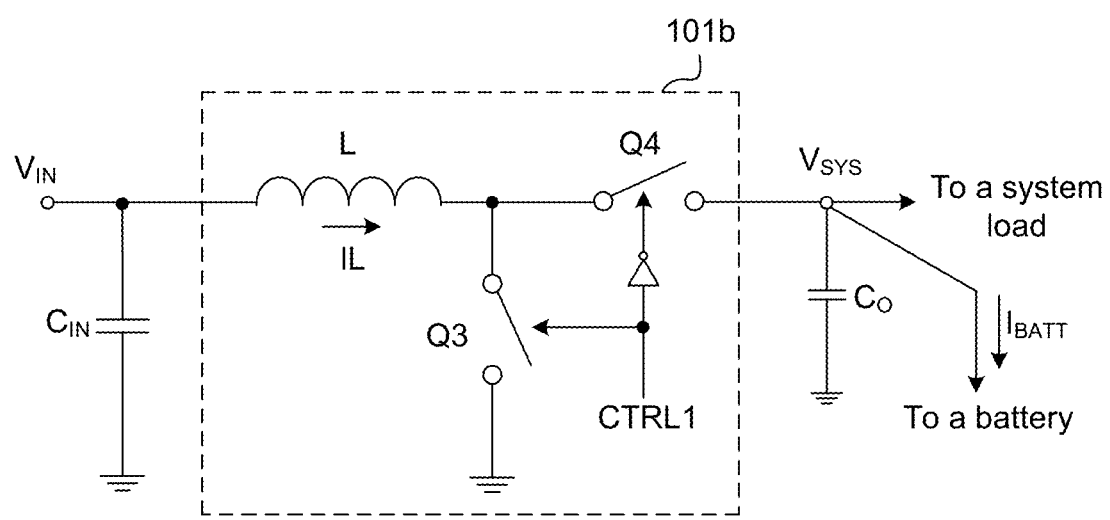
FIG. 4b schematically illustrates a switching circuit 101b in accordance with another embodiment of the present invention.

FIG. 4b schematically illustrates a switching circuit 101b in accordance with another embodiment of the present invention. The switching circuit 101b adopts a step-up (Boost) circuit as one example. The switching circuit 101b comprises a capacitor $C_{IN}$ coupled between the input terminal of switching circuit 101b and the reference ground, a capacitor $C_O$ coupled between the output terminal of switching circuit 101b and the reference ground, switches Q3 and Q4, and an inductor L. The inductor L has a first terminal coupled to the input terminal of the switching circuit 101b, and a second terminal. The switch Q3 has a first terminal coupled to the second terminal of the inductor L, and a second terminal coupled to the reference ground. The switch Q4 has a first terminal coupled to the second terminal of inductor L and the first terminal of the switch Q3, and a second terminal coupled to the output terminal of switching circuit 101b. The switches Q3 and Q4 are controlled by a first control signal CTRL1 provided by the control circuit 104, and work complementarily. In one embodiment, the switch Q4 may be substituted by a diode.

Figure 4C:
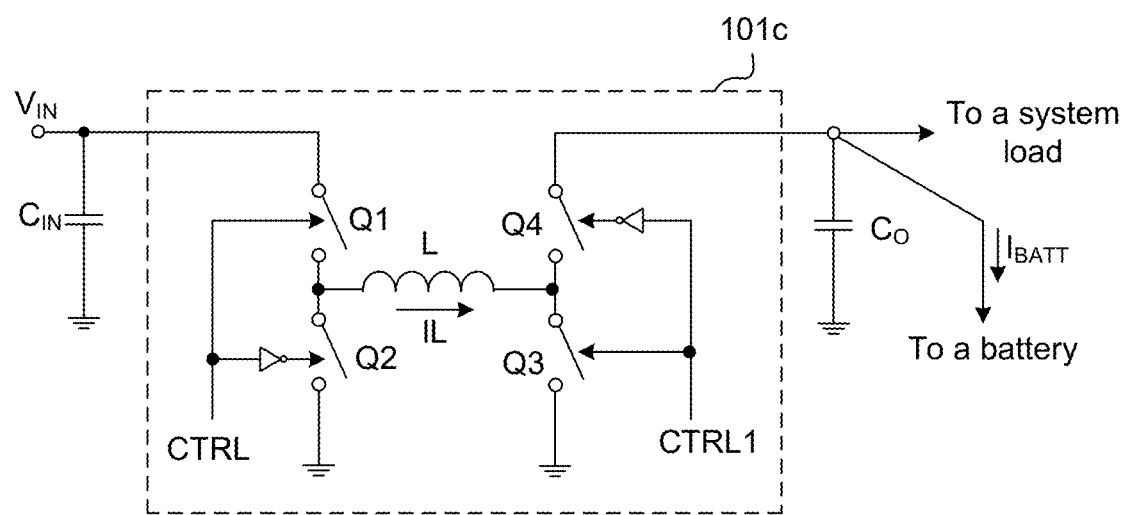
FIG. 4c schematically illustrates a switching circuit 101c in accordance with yet another embodiment of the present invention.

FIG. 4c schematically illustrates a switching circuit 101c in accordance with yet another embodiment of the present invention. The switching circuit 101c adopts a Buck-Boost circuit as one example. The switching circuit 101c comprises a capacitor $C_{IN}$ coupled between the input terminal of switching circuit 101c and the reference ground, a capacitor $C_O$ coupled between the output terminal of switching circuit 101c and the reference ground, switches Q1-Q4, and an inductor L. The switch Q1 has a first terminal coupled to the input terminal of switching circuit 101c, and a second terminal. The switch Q2 has a first terminal coupled to the second terminal of the switch Q1, and a second terminal coupled to the reference ground. The switch Q3 has a first terminal coupled to the output terminal of switching circuit 101c, and a second terminal. The switch Q4 has a first terminal coupled to the second terminal of the switch Q3, and a second terminal coupled to the reference ground. The Inductor L has a first terminal coupled to the second terminal of switch Q1 and the first terminal of the switch Q2, and a second terminal coupled to the second terminal of the switch Q3 and the first terminal of the switch Q4. The switches Q1 and Q2 are controlled by the control signal CTRL, and work complementarily. The switches Q3 and Q4 are controlled by a first control signal CTRL1 provided by the control circuit 104, and work complementarily. In one embodiment, the switch Q2 and/or switch Q4 may be substituted by a diode.

One of ordinary skill in the art should appreciate that specific circuit structure of switching circuit 101 is not limited as FIG. 4a-4c shown, other circuits may be also used without detracting from merits of the present invention.

Figure 5:
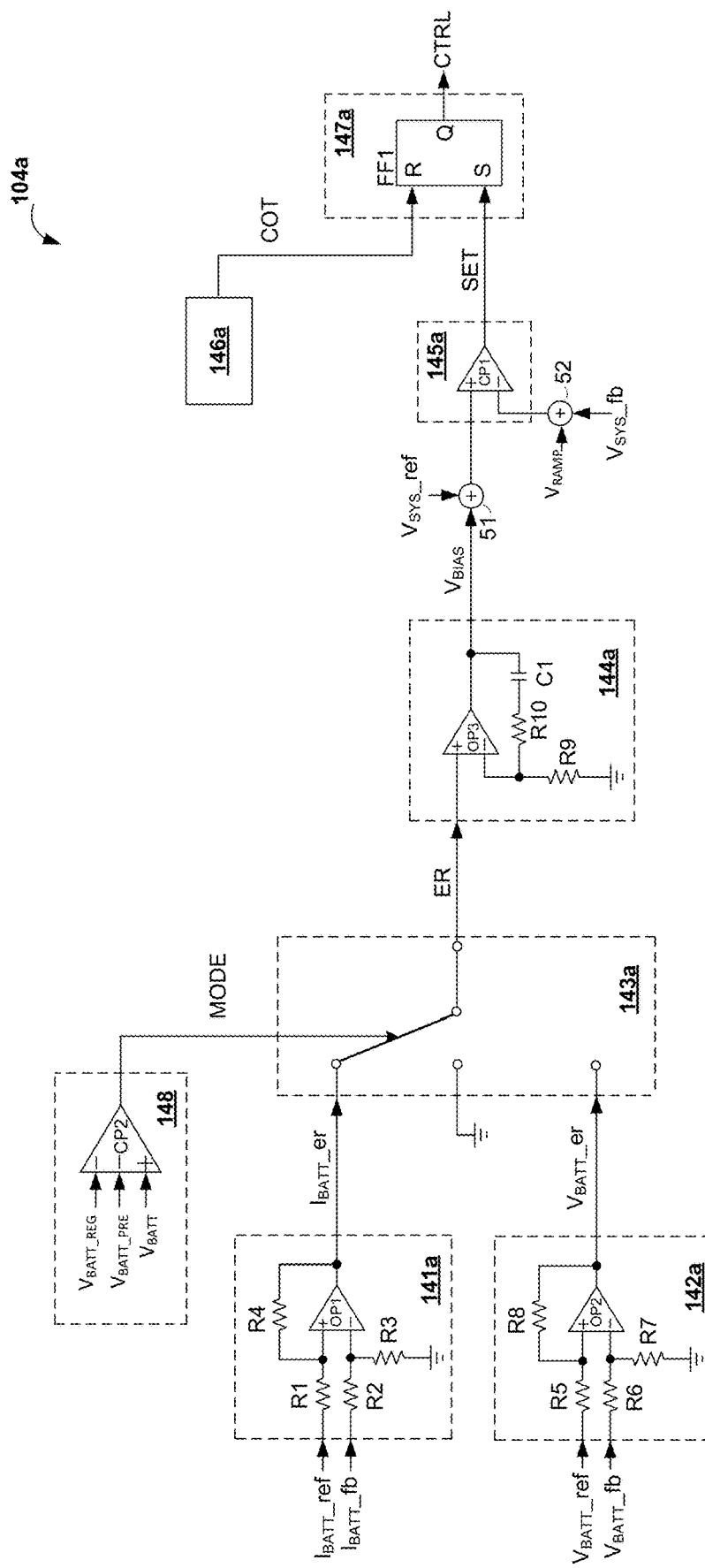
FIG. 5 shows a circuit diagram of a control circuit 104a shown in FIG. 3 in accordance with an embodiment of the present invention.

FIG. 5 shows a circuit diagram of a control circuit 104a shown in FIG. 3 in accordance with an embodiment of the present invention. In the embodiment of FIG. 5, the control circuit 104a comprises a first difference circuit 141a, a second difference circuit 142a, a selection circuit 143a, a bias circuit 144a, a comparison circuit 145a, a constant time period control circuit 146a and a mode identification circuit 148.

In the embodiment of FIG. 5, the first difference circuit 141a comprises a first subtracting circuit having an operational amplifier OP1 and resistors R1~R4. The first subtracting circuit has a first input terminal, a second input terminal and an output terminal, wherein the first input terminal is configured to receive a charging current feedback signal $I_{BATT}\_fb$, the second input terminal is configured to receive a charging current reference signal $I_{BATT}\_ref$, the first subtracting circuit provides a first difference signal $I_{BATT}\_er$. The second difference circuit 142a comprises a second subtracting circuit having an operational amplifier OP2 and resistors R5~R8. The second subtracting circuit has a first input terminal, a second input terminal and an output terminal, wherein the first input terminal is configured to receive a battery voltage feedback signal $V_{BATT}\_fb$, the second input terminal is configured to receive a battery voltage reference signal $V_{BATT}\_ref$, and the second subtracting circuit provides the second difference signal $V_{BATT}\_er$ at the output terminal. The configuration of the first subtracting circuit and the second subtracting circuit is shown in FIG. 5, which is well known to persons of ordinary skill in the art, and will not be discussed here for brevity.

The mode identification circuit 148 determines the charging stage of the battery charging circuit based on the battery voltage $V_{BATT}$. As shown in FIG. 5, the mode identification circuit 148 comprises a comparator CP2, which receives a battery voltage $V_{BATT}$, a first threshold $V_{BATT\_PRE}$ and a second threshold $V_{BATT\_REG}$, and provides a mode signal MODE at an output terminal. In detail, when the battery voltage $V_{BATT}$ is less than a first threshold $V_{BATT\_PRE}$, the mode signal MODE has a first level, which represents the battery charging circuit is at the pre-charge stage. When the battery voltage $V_{BATT}$ is less than the second threshold $V_{BATT\_REG}$ and higher than the first threshold $V_{BATT\_PRE}$, the mode signal MODE has a second level, which represents the battery charging circuit is at the CC charge stage. When the battery voltage $V_{BATT}$ increases to the second threshold $V_{BATT\_REG}$, the mode signal MODE has a third level, which represents the battery charging circuit is at the CV charging stage.

The selection circuit 143a has a first input terminal, a second input terminal, a third input terminal, a control terminal and an output terminal, wherein the first input terminal is coupled to the output terminal of the first difference circuit 141a to receive the first difference signal $I_{BATT}\_er$, the second input terminal is coupled to the output terminal of the second difference circuit 142a to receive the second difference signal $V_{BATT}\_er$, the third input terminal is coupled to the reference ground to receive a ground voltage, the control terminal is configured to receive the mode signal MODE, the selection circuit 143a based on the mode signal MODE, selects one of the first difference signal $I_{BATT}\_er$, the second difference signal $V_{BATT}\_er$ and the ground voltage as the third difference signal ER and provides the third difference signal ER at the output terminal. The bias circuit 144a comprises a proportional integrating circuit having an operational amplifier OP3, resistors R9 and R10, and a capacitor C1. The proportional integrating circuit receives the third difference signal ER and proportionally integrates the third difference signal ER, and provides a bias signal $V_{BIAS}$ at an output terminal. The proportional integrating circuit shown in FIG. 5 is well known to persons of ordinary skill in the art, and will not be discussed here for brevity.

In the embodiment of FIG. 5, the control circuit 104a further comprises summing circuits 51 and 52. Wherein the summing circuit 51 has a first input terminal, a second input terminal and an output terminal, wherein the first input terminal is coupled to the output terminal of the bias circuit 144a to receive the bias signal $V_{BIAS}$, the second input terminal is configured to receive a system voltage reference signal $V_{SYS}\_ref$, and the summing circuit 51 provides a bias reference signal $V_{SYS}\_ref$. the summing circuit 52 has a first input terminal, a second input terminal and an output terminal, wherein the first input terminal is configured to receive a system voltage feedback signal $V_{SYS}\_fb$, the second input terminal is configured to receive a ramp signal $V_{RAMP}$. The comparison circuit 145a comprises a comparator CP1. The comparator CP1 has a non-inverting terminal, an inverting terminal and an output terminal, wherein the non-inverting terminal is coupled to the output terminal of the summing circuit 51 to receive the bias reference signal $V_{SYS}\_ref$, the inverting terminal is coupled to an output terminal of the summing circuit 52 to receive the sum of the system voltage feedback signal $V_{SYS}\_fb$ and the ramp signal $V_{RAMP}$, and provides a comparison signal SET.

The constant time period control circuit 146a provides a constant time period control signal COT at an output terminal. In one embodiment, the constant time period control signal COT is configured to control the ON-time of the switch Q1 of the switching circuit 101a shown in FIG. 4a. In another embodiment, the constant time period control signal COT is configured to control the ON-time of the switch Q1 of the switching circuit 101c shown in FIG. 4c. The logic circuit 147a comprises a RS flip-flop FF1. The RS flip-flop FF1 has a setting terminal, a resetting terminal and an output terminal, wherein the setting terminal is coupled to the output terminal of the comparison circuit 145a to receive the comparison signal SET, the resetting terminal is coupled to the output terminal of the constant time period control circuit 146a to receive the constant time period control signal COT. The RS flip-flop FF1 provides a control signal CTRL at the output terminal, based on the constant time period control signal COT and the comparison signal SET. In one embodiment, the control circuit 104a provides a control signal CTRL to control the switches Q1 and Q2 of the switching circuit 101a shown in FIG. 4a. In another embodiment, the control circuit 104a provides a control signal CTRL to control the switches Q1 and Q2 of the switching circuit 101c shown in FIG. 4c.

Figure 6:
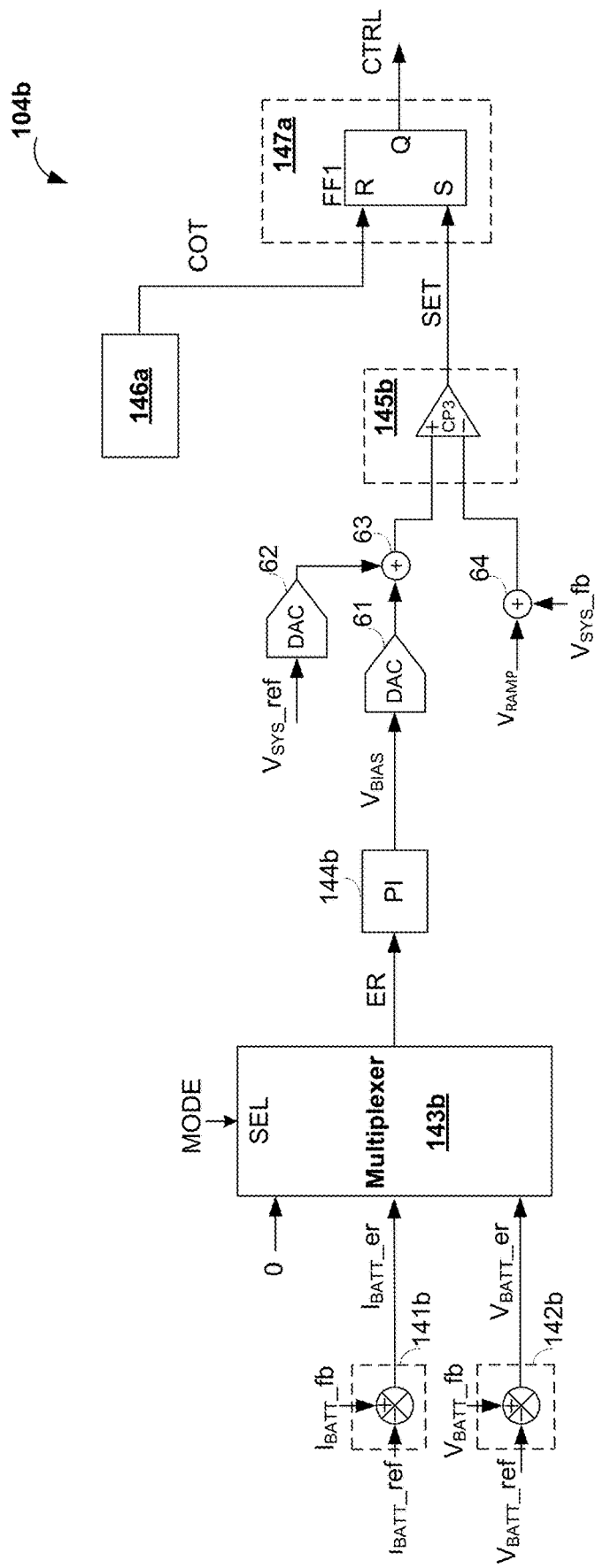
FIG. 6 shows a circuit diagram of a control circuit 104b shown in FIG. 3 in accordance with another embodiment of the present invention.

FIG. 6 shows a circuit diagram of a control circuit 104b shown in FIG. 3 in accordance with another embodiment of the present invention. In the embodiment of FIG. 6, the control circuit 104b comprises a first difference circuit 141b, a second difference circuit 142b, a selection circuit 143b, a bias circuit 144b, a comparison circuit 145b, a constant time period control circuit 146b and a logic circuit 147a.

As shown in FIG. 6, the first difference circuit 141b comprises a first subtracter. The first subtracter has a first input terminal, a second input terminal and an output terminal, wherein the first input terminal is configured to receive a charging current feedback signal $I_{BATT}\_fb$, the second input terminal is configured to receive a charging current reference signal $I_{BATT}\_ref$, the first subtracter subtracts the charging current reference signal $I_{BATT}\_ref$ from the charging current feedback signal $I_{BATT}\_fb$ and provides a first difference signal $I_{BATT}\_er$ at the output terminal. The second difference circuit 142b comprises a second subtracter. The second subtracter has a first input terminal, a second input terminal and an output terminal, wherein the first input terminal is configured to receive a battery voltage feedback signal $V_{BATT}\_fb$, the second input terminal is configured to receive the battery voltage reference signal $V_{BATT}\_ref$, the second subtracter subtracts the battery voltage reference signal $V_{BATT}\_ref$ from the battery voltage feedback signal $V_{BATT}\_fb$, and provides a second difference signal $V_{BATT}\_er$ at the output terminal.

The selection circuit 143b comprises a multiplexer. The multiplexer has a first input terminal, a second input terminal, a third input terminal and an output terminal, wherein the first input terminal is coupled to the output terminal of the first difference circuit 141b to receive the first difference signal $I_{BATT}$_er, the second input terminal is coupled to the output terminal of the second difference circuit 142b to receive the second difference signal $V_{BATT}$_er, the third input terminal is coupled to receive a ground voltage. based on the mode signal MODE, the multiplexer selects one of the first difference signal $I_{BATT}$_er, the second difference signal $V_{BATT}$_er and the ground voltage as a third difference signal ER and provide the third difference signal ER at the output terminal.

The bias circuit 144b comprises a proportional integrator PI. The proportional integrator PI is coupled to the output terminal of the selection circuit 143b to receive the third difference signal ER, proportionally integrates the third difference signal ER and provides a bias signal $V_{BIAS}$ at the output terminal.

In the embodiment of FIG. 6, the control circuit 104b further comprises digital analog converters 61 and 62, summing circuits 63 and 64. Wherein each of digital analog converters 61 and 62 has an input terminal and an output terminal and is configured to convert an inputted digital signal into an outputted analog signal. The summing circuit 63 has a first input terminal, a second input terminal and an output terminal, wherein the first input terminal is configured to receive the bias signal $V_{BIAS}$, the second input terminal is configured to receive a system voltage reference signal $V_{SYS}$_ref. The summing circuit 64 has a first input terminal, a second input terminal and an output terminal, wherein the first input terminal is configured to receive a system voltage feedback signal $V_{SYS}$_fb, the second input terminal is configured to receive the ramp signal $V_{RAMP}$.

The comparison circuit 145b comprises a comparator CP3. The comparator CP3 has a non-inverting terminal, an inverting terminal and an output terminal, wherein the non-inverting terminal is coupled to the output terminal of the summing circuit 63 to receive the sum of the bias signal $V_{BAIS}$ and the system voltage reference signal $V_{SYS}$_ref, the inverting terminal is coupled to the output terminal of the summing circuit 64 to receive the system voltage feedback signal $V_{SYS}$_fb and the ramp signal $V_{RAMP}$, the comparator 145b provides a comparison signal SET at the output terminal.

Figure 7:
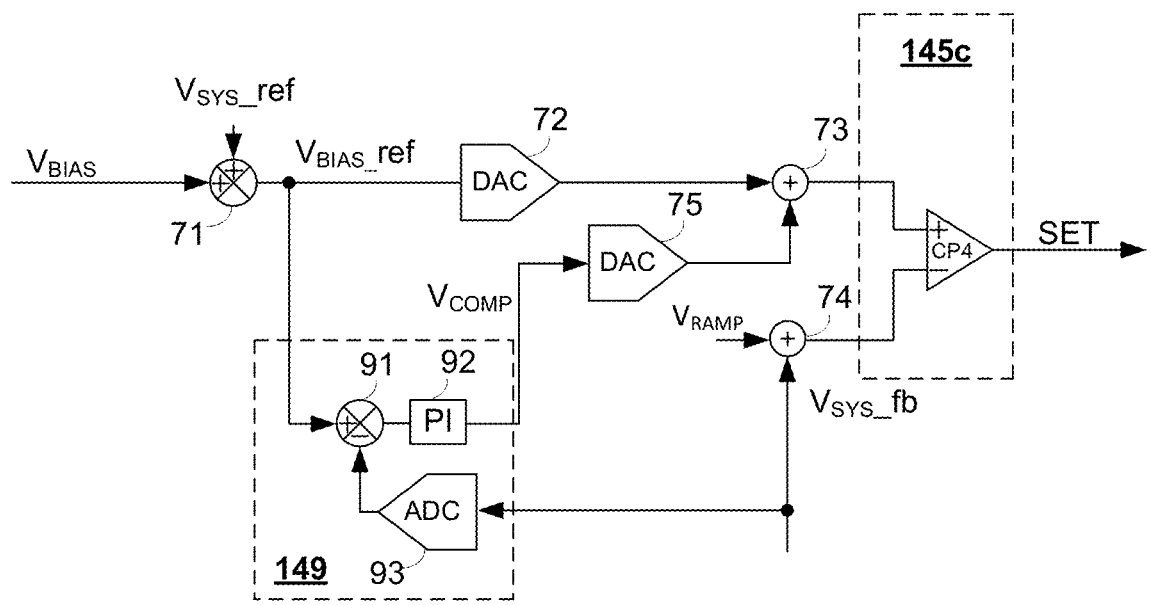
FIG. 7 shows a part of circuit diagram of a control circuit shown in FIG. 3 in accordance with an embodiment of the present invention.

FIG. 7 shows a part of circuit diagram of a control circuit shown in FIG. 3 in accordance with an embodiment of the present invention. The control circuit of FIG. 7 is different from the control circuit 104b of FIG. 6 in that the circuit between the output terminal of the bias circuit 144b and the setting terminal of the logic circuit 147a, in detail, the circuit is replaced by an error correction circuit 149, an adder circuit 71, a digital analog converter 72, summing circuits 73 and 74, and a comparison circuit 145c, which is shown in FIG. 7. The adder circuit 71 has a first input terminal, a second input terminal and an output terminal, wherein the first input terminal is coupled to the output terminal of the bias circuit 144b to receive the bias signal $V_{BIAS}$, the second input terminal is configured to receive the system voltage reference signal $V_{SYS}$_ref, the adder circuit 71 is configured to provide the sum of the bias signal $V_{BIAS}$ and the system voltage reference signal $V_{SYS}$_ref as a bias reference signal $V_{BIAS}$_ref at the output terminal.

The error correction circuit 149 has a first input terminal, a second input terminal and an output terminal, wherein the first input terminal is configured to receive a system voltage feedback signal $V_{SYS}$_fb, the second input terminal is configured to receive the bias reference signal $V_{BIAS}$_ref. the error correction circuit 149 based on the error signal between the system voltage feedback signal $V_{SYS}$_fb and the bias reference signal $V_{BIAS}$_ref, and provides an error correction signal $V_{COMP}$ at an output terminal. In the embodiment of FIG. 7, the error correction circuit 149 comprises a subtracter 91, a proportional integrator 92 and an analog digital converter 93. The subtracter 91 has a first input terminal, a second input terminal and an output terminal, wherein the first input terminal is coupled to the output terminal of the adder circuit 71 to receive the bias reference signal $V_{BIAS}$_ref, the second input terminal is coupled to the output terminal of the analog digital converter 93 to receive a digital system voltage feedback signal $V_{SYS}$_fb, the subtracter 91 provides the error signal between the bias reference signal $V_{BIAS}$_ref and the system voltage feedback signal $V_{SYS}$_fb. The proportional integrator 92 has an input terminal and an output terminal, wherein the input terminal is couple to the output terminal of the subtracter 91 and provides the error correction signal $V_{COMP}$ at an output terminal.

The comparison circuit 145c comprises a comparator CP4. The comparator CP4 has a non-inverting terminal, an inverting terminal and an output terminal, wherein the non-inverting terminal is coupled to the output terminal of the summing circuit 73 to receive the sum of the bias reference signal $V_{BIAS}$_ref and the error correction signal $V_{COMP}$, the inverting terming is coupled to the output terminal of the summing circuit 74 to receive the sum of the system voltage feedback signal $V_{SYS}$_fb and a ramp signal $V_{RAMP}$, and provides a comparison signal SET at the output terminal.

Figure 8:
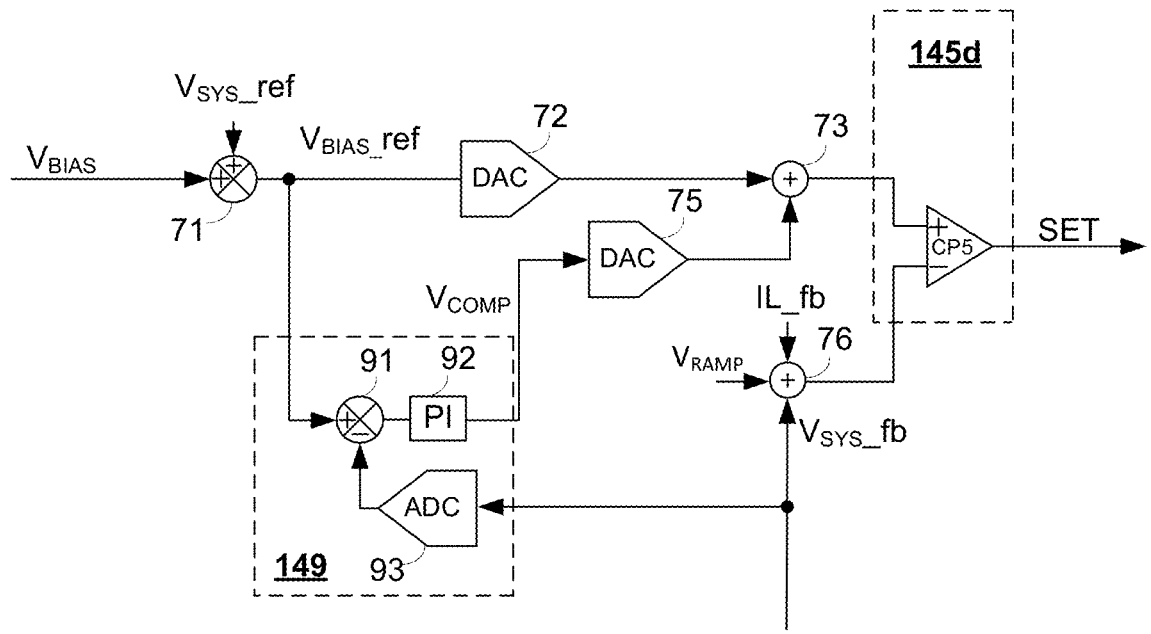
FIG. 8 shows a part of circuit diagram of a control circuit shown in FIG. 3 in accordance with another embodiment of the present invention.

FIG. 8 shows a part of circuit diagram of a control circuit shown in FIG. 3 in accordance with another embodiment of the present invention. As shown in FIG. 8, the summing circuit 74 shown in FIG. 7 is further replaced by the summing circuit 76 shown in FIG. 8, and the comparison circuit 145c of FIG. 7 is replaced by a comparison circuit 145d shown in FIG. 8. The summing circuit 76 has a first input terminal, a second input terminal, a third input terminal and an output terminal, wherein the first input terminal is coupled to receive a system voltage feedback signal $V_{SYS}$_fb, the second input terminal is coupled to receive a ramp signal $V_{RAMP}$, the third terminal is coupled to receive a current feedback signal IL_fb representative of an inductor current IL of the switching circuit 101. The comparison circuit 145d comprises a comparator CP5, the comparator CP5 has a non-inverting terminal, an inverting terminal and an output terminal, wherein the non-inverting terminal is coupled to the output terminal of the summing circuit 73 to receive the sum of the system voltage feedback signal $V_{SYS}$_fb, the ramp signal $V_{RAMP}$ and the current feedback signal IL_fb, and provides a comparison signal SET at an output terminal.

One with ordinary skill in the art should appreciate that specific circuit structure of control circuit 104a is not limited as FIG. 6 shown. For example, signals that the inverting terminal and the non-inverting terminal of the comparator of the comparison circuit received may be interchanged to realize a same function with inversed logic level.

Figure 9:
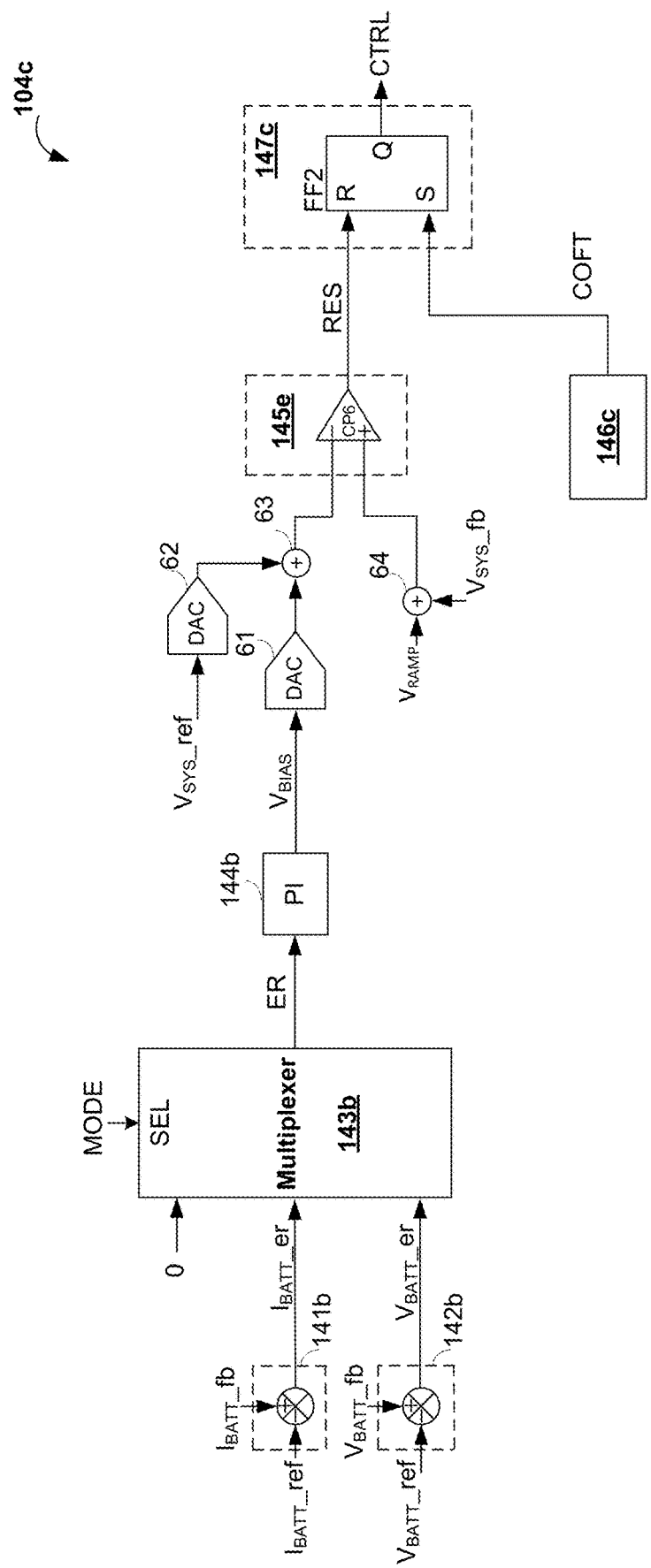
FIG. 9 shows a circuit diagram of a control circuit 104c shown in FIG. 3 in accordance with yet another embodiment of the present invention.

FIG. 9 shows a circuit diagram of a control circuit 104c shown in FIG. 3 in accordance with yet another embodiment of the present invention. As shown in FIG. 9, the control circuit 104c comprises a first difference circuit 141b, a second difference circuit 142b, a selection circuit 143b, a bias circuit 144b, a comparison circuit 145e, a constant time period control circuit 146c, a logic circuit 147c, digital analog converters 61 and 62, and summing circuits 63 and

64. Wherein the first difference circuit 141*b*, the second difference circuit 142*b*, the selection circuit 143*b*, the bias circuit 144*b*, the digital analog converters 61 and 62, and the summing circuits 63 and 64 has been described in the embodiment of FIG. 6 and thus description of them is omitted. The comparison circuit 145*e* comprises a comparator CP6. The comparator CP6 has a non-inverting terminal, an inverting terminal and an output terminal, wherein the non-inverting terminal is coupled to the output terminal of the summing circuit 63 to receive the sum of the bias signal $V_{BIAS}$ and the system voltage reference signal $V_{SYS}\_ref$, the non-inverting terminal is coupled to the output terminal of the summing circuit 64 to receive the sum of the system voltage feedback signal $V_{SYS}\_fb$ and the ramp signal $V_{RAMP}$, and provides a comparison signal RESET at the output terminal.

The constant time period control circuit 146*b* is configured to provide a constant time period control signal COFT at an output terminal. In one embodiment, the constant time period control circuit 146*b* comprises a constant OFF-time control circuit, in detail, during each of switching cycles, the constant time period control signal COFT has a pulse, which is used to trig the ON state of the at least one switch after a preset constant OFF-time period. The constant OFF-time control circuit is well known to persons of ordinary skill in the art, and will not be discussed here for brevity. In one embodiment, the constant time period control signal COFT is configured to control the OFF-time of the switch Q3 of the switching circuit 101*b* shown in FIG. 4*b*. in another embodiment, the constant time period control signal COFT is configured to control the switch Q3 of the switching circuit 103*c* shown in FIG. 4*c*.

The logic circuit 147*c* comprises a RS flip-flop FF2, the RS flip-flop FF2 has a setting terminal, a resetting terminal and an output terminal, wherein the resetting terminal is coupled to the output terminal of the comparison circuit 145*e* to receive the comparison signal RESET, the resetting terminal is coupled to the output terminal of the constant time period control circuit 146*b* to receive the constant time period control signal COFT. The RS flip-flop FF2 provides a first control signal CTRL1 at the output terminal based on the constant time period control signal COFT and the comparison signal RESET. In one embodiment, the control circuit 104*c* provides the first control signal CTRL1 to control the switches Q3 and Q4 in the switching circuit 101*b* shown in FIG. 4*b*. in another embodiment, the control circuit 104*c* provides the first control signal CTRL1 to control the switches Q3 and Q4 in the switching circuit 101*c* shown in FIG. 4*c*.

Figure 10:
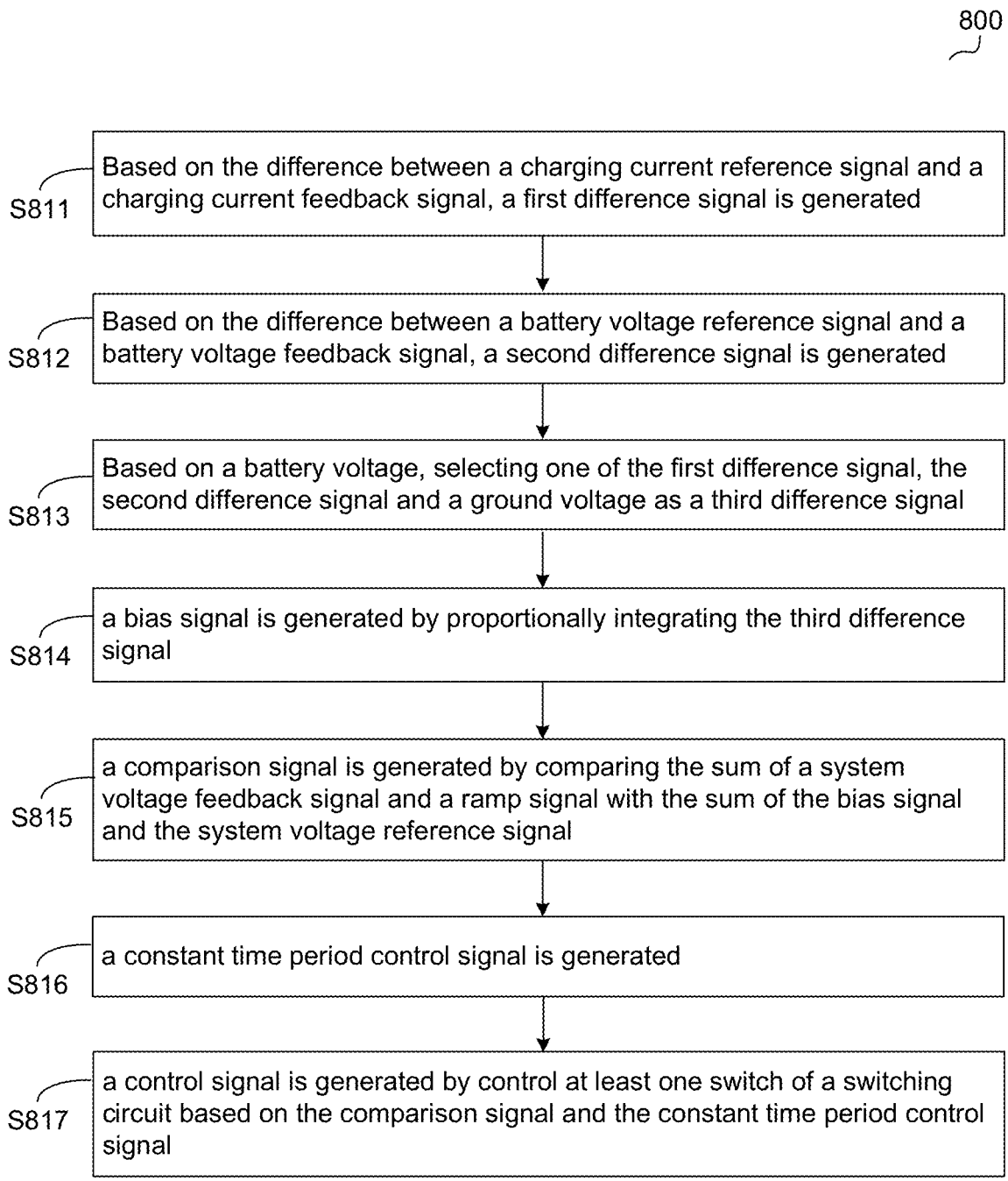
FIG. 10 shows a work flow of a control method 800 for controlling a battery charging circuit in accordance with an embodiment of the present invention.

FIG. 10 shows a work flow of a control method 800 for controlling a battery charging circuit in accordance with an embodiment of the present invention. The battery charging circuit comprises a switching circuit having at least one switch and an inductor coupled to the at least one switch, the switching circuit provides a system voltage to a system load and charges an associated battery, the control method comprises steps S811-S817.

At step S811, based on the difference between a charging current feedback signal and a charging current reference signal, a first difference signal is generated.

At step S812, based on the difference between a battery voltage feedback signal and a battery voltage reference signal, a second difference signal is generated.

At step S813, based on a battery voltage, one of the first difference signal, the second difference signal and a ground voltage is selected as a third difference signal.

At step S814, a bias signal is generated by proportionally integrating the third difference signal.

At step S815, a comparison signal is generated by comparing the sum of a system voltage feedback signal and a ramp signal with the sum of the bias signal and the system voltage reference signal.

At step S816, a constant time period control signal is generated.

At step S817, a control signal is generated by control at least one switch of a switching circuit based on the comparison signal and the constant time period control signal.

In one embodiment, when the battery voltage is less than a first threshold, the ground voltage is selected as the third difference signal. When the battery voltage is higher than the first threshold and less than a second threshold, the first difference signal is selected as the third difference signal. when the battery voltage is increased to reach the second threshold, the second difference signal is selected as the third difference signal.

The sum of the bias signal and the system voltage reference signal is a bias reference signal. In one embodiment, the control method 800 further comprises: generating an error correction signal based on an error signal between a system voltage feedback signal and the bias reference signal; and comparing the sum of the bias reference signal and the error correction with the sum of the system voltage feedback signal and the ramp signal and generating a comparison signal.

In one embodiment, the control method further comprises: sampling an inductor current of the switching circuit and providing a current feedback signal; and comparing the sum of the bias reference signal and the error correction signal with the sum of the system voltage feedback signal, a ramp signal and the current feedback signal, and generating the comparison signal.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit used in a battery charging circuit having at least one switch and an inductor coupled to the at least one switch, the control circuit comprising:
a first difference circuit configured to receive a charging current feedback signal and a charging current reference signal and to provide a first difference signal at an output terminal;

a second difference circuit configured to receive a battery voltage feedback signal and a battery voltage reference signal and to provide a second difference signal at an output terminal;

a selection circuit having a first input terminal configured to receive the first difference signal and a second input terminal configured to receive the second difference signal, wherein based on a battery voltage, the selection circuit selects either the first difference signal, the second difference signal, or a ground voltage as a third difference signal at an output terminal;

a bias circuit coupled to the output terminal of the selection circuit to receive the third difference signal, the bias circuit proportionally integrates the third difference signal and provides a bias signal at an output terminal;

a comparison circuit having a first input terminal, a second input terminal and an output terminal, wherein the first input terminal is configured to receive the sum of the bias signal and a system voltage reference signal, the second input terminal is configured to receive the sum of a system voltage feedback signal and a ramp signal, the comparison circuit provides a comparison signal at the output terminal, and wherein the sum of the bias signal and the system voltage reference signal is a bias reference signal;

a constant time period control circuit configured to provide a constant time period control signal; and a logic circuit configured to receive the comparison signal and the constant time period control signal, wherein the logic circuit provides a control signal at an output terminal to control the at least one switch.

2. The control circuit of claim 1, further comprising:

an error correction circuit having a first input terminal, a second input terminal and an output terminal, wherein the first input terminal is configured to receive the system voltage feedback signal, a second input terminal is configured to receive the bias reference signal, the error correction circuit provides an error correction signal at the output terminal based on the system voltage feedback signal and the bias reference signal; and wherein the first input terminal of the comparison circuit is configured to receive the sum of the bias reference signal and the error correction signal, the comparison circuit provides the comparison signal at the output terminal.

3. The control circuit of claim 2, wherein the second input terminal of the comparison circuit is configured to receive the sum of the system voltage feedback signal, the ramp signal and a current feedback signal representative of a current flowing through the inductor, the comparison circuit compares the sum of the bias reference signal and the error correction signal with the sum of the system voltage feedback signal, the ramp signal and the current feedback signal, and provides the comparison signal at the output terminal.

4. The control circuit of claim 1, wherein:

when the battery voltage is less than a first threshold, the ground voltage is selected as the third difference signal;

when the battery voltage is higher than the first threshold and less than a second threshold, the first difference signal is selected as the third difference signal; and when the battery voltage is increased to reach the second threshold, the second difference signal is selected as the third difference signal.

5. The control circuit of claim 1, wherein the logic circuit comprises:

a RS flip-flop having a setting terminal, a resetting terminal and an output terminal, wherein the setting terminal is coupled to the comparison circuit to receive the comparison signal, the resetting terminal is coupled to the constant time period control circuit to receive the constant time period control signal, the RS flip-flop provides the control signal at the output terminal based on the constant time period control signal and the comparison signal.

6. The control circuit of claim 1, wherein the logic circuit comprises:

a RS flip-flop having a setting terminal, a resetting terminal and an output terminal, wherein the resetting terminal is coupled to the comparison circuit to receive the comparison signal, the setting terminal is coupled to the constant time period control circuit to receive the constant time period control signal, the RS flip-flop provides the control signal at the output terminal based on the constant time period control signal and the comparison signal.

7. A battery charging circuit, comprising:

a switching circuit having at least one switch and an inductor coupled to the at least one switch;

a first difference circuit configured to receive a charging current feedback signal and a charging current reference signal and to provide a first difference signal at an output terminal;

a second difference circuit configured to receive a battery voltage feedback signal and a battery voltage reference signal and to provide a second difference signal at an output terminal;

a selection circuit having a first input terminal configured to receive the first difference signal and a second input terminal configured to receive the second difference signal, wherein based on a battery voltage, the selection circuit selects one of the first difference signal, the second difference signal and a ground voltage as a third difference signal at an output terminal;

a bias circuit coupled to the output terminal of the selection circuit to receive the third difference signal, the bias circuit proportionally integrates the third difference signal and provides a bias signal at an output terminal;

a comparison circuit having a first input terminal, a second input terminal and an output terminal, wherein the first input terminal is configured to receive the sum of the bias signal and a system voltage reference signal, the second input terminal is configured to receive the sum of a system voltage feedback signal and a ramp signal, the comparison circuit provides a comparison signal at the output terminal, and wherein the sum of the bias signal and the system voltage reference signal is a bias reference signal;

a constant time period control circuit configured to provide a constant time period control signal; and a logic circuit configured to receive the comparison signal and the constant time period control signal, wherein the logic circuit provides a control signal at an output terminal to control the at least one switch.

8. The battery charging circuit of claim 7, further comprising:

an error correction circuit having a first input terminal, a second input terminal and an output terminal, wherein the first input terminal is configured to receive the system voltage feedback signal, a second input terminal is configured to receive the bias reference signal, the error correction circuit provides an error correction signal at the output terminal based on the system voltage feedback signal and the bias reference signal; and wherein the first input terminal of the comparison circuit is configured to receive the sum of the bias reference signal and the error correction signal, the comparison circuit provides the comparison signal at the output terminal.

9. The battery charging circuit of claim 8, wherein the second input terminal of the comparison circuit is configured to receive the sum of the system voltage feedback signal, the ramp signal and a current feedback signal representative of a current flowing through the inductor, the comparison circuit compares the sum of the bias reference signal and the error correction signal with the sum of the system voltage feedback signal, the ramp signal and the current feedback signal, and provides the comparison signal at the output terminal.

10. The battery charging circuit of claim 7, wherein:
when the battery voltage is less than a first threshold, the ground voltage is selected as the third difference signal;
when the battery voltage is higher than the first threshold and less than a second threshold, the first difference signal is selected as the third difference signal;
when the battery voltage is increased to reach the second threshold, the second difference signal is selected as the third difference signal.

11. The battery charging circuit of claim 7, wherein the logic circuit comprises:
a RS flip-flop having a setting terminal, a resetting terminal and an output terminal, wherein the setting terminal is coupled to the comparison circuit to receive the comparison signal, the resetting terminal is coupled to the constant time period control circuit to receive the constant time period control signal, the RS flip-flop provides the control signal at the output terminal based on the constant time period control signal and the comparison signal.

12. The battery charging circuit of claim 7, wherein the logic circuit comprises:
a RS flip-flop having a setting terminal, a resetting terminal and an output terminal, wherein the resetting terminal is coupled to the comparison circuit to receive the comparison signal, the setting terminal is coupled to the constant time period control circuit to receive the constant time period control signal, the RS flip-flop provides the control signal at the output terminal based on the constant time period control signal and the comparison signal.

13. The battery charging circuit of claim 7, wherein the at least one switch comprises:
a first switch, having a first terminal, a second terminal and a control terminal, wherein the first terminal is coupled to an input terminal of the switching circuit, and the control terminal is configured to receive the control signal; and
a second switch, having a first terminal, a second terminal, wherein the first terminal is coupled to the second terminal of the first switch, and the second terminal is coupled to a reference ground; and
wherein the inductor is coupled between the second terminal of the first switch and an output terminal of the switching circuit.

14. The battery charging circuit of claim 7, wherein the inductor has a first terminal coupled to an input terminal of the switching circuit and a second terminal, and wherein the at least one switch comprises:

a first switch, having a first terminal, a second terminal and a control terminal, wherein the first terminal is coupled to the second terminal of the inductor, the second terminal is coupled to a reference ground, and the control terminal is configured to receive the control signal; and
a second switch, having a first terminal and a second terminal, wherein the first terminal is coupled to the second terminal of the inductor and the first terminal of the first switch, the second terminal is coupled to an output terminal of the switching circuit.

15. The battery charging circuit of claim 7, wherein the switching control circuit is further configured to provide a first control signal, and wherein the at least one switch comprises:
a first switch, having a first terminal, a second terminal and a control terminal, wherein the first terminal is coupled to an input terminal of the switching circuit, and the control terminal is configured to receive the control signal;
a second switch, having a first terminal and a second terminal, the first terminal is coupled to the second terminal of the first switch, and the second terminal is coupled to a reference ground;
a third switch, having a first terminal and a second terminal, wherein the first terminal is coupled to an output terminal of the switching circuit; and
a fourth switch, having a first terminal, a second terminal and a control terminal, wherein the first terminal is coupled to the second terminal of the third switch, the second terminal is coupled to the reference ground, and the control terminal is configured to receive the first control signal; and
wherein the inductor has a first terminal and a second terminal, and the first terminal is coupled to the second terminal of the first switch and the first terminal of the second switch, and the second terminal is coupled to the second terminal of the third switch and the first terminal of the fourth switch.

16. A control method for controlling a battery charging circuit having at least one switch and an inductor coupled to the at least one switch, the control method comprising:
generating a first difference signal based on the difference between a charging current feedback signal and a charging current reference signal;
generating a second difference signal based on the difference between a battery voltage feedback signal and a battery voltage reference signal;
based on a battery voltage, selecting one of the first difference signal, the second difference signal and a ground voltage as a third difference signal;
generating a bias signal by proportionally integrating the third difference signal;
comparing the sum of a system voltage feedback signal and a ramp signal with the sum of the bias signal and a system voltage reference signal and generating a comparison signal;
generating a constant time period control signal; and
generating a control signal for controlling the at least one switch based on the comparison signal and the constant time period control signal.

17. The control method of claim 16, the sum of the bias signal and the system voltage reference signal is a bias reference signal, the control method further comprises:
generating an error correction signal based on an error signal between the system voltage feedback signal and the bias reference signal; and comparing the sum of the system voltage feedback signal and the ramp signal with the sum of the bias reference signal and the error correction signal instead of comparing the sum of the system voltage feedback signal and the ramp signal with the bias reference signal, and generating the comparison signal.

18. The control method of claim 17, further comprises:

sampling an inductor current and providing a current feedback signal; and comparing the sum of the system voltage feedback signal, the ramp signal and the current feedback signal with the sum of the bias reference signal and the error correction signal instead of comparing the sum of the system voltage feedback signal and the ramp signal with the sum of the bias reference signal and the error correction signal, and generating the comparison signal.

19. The control method of claim 16, wherein:

when the battery voltage is less than a first threshold, the ground voltage is selected as the third difference signal;

when the battery voltage is higher than the first threshold and less than a second threshold, the first difference signal is selected as the third difference signal; and when the battery voltage is increased to reach the second threshold, the second difference signal is selected as the third difference signal.

* * * * *